United States Patent [19]

Okada

[11] Patent Number: 5,102,074

[45] Date of Patent: Apr. 7, 1992

[54] SUPPORTING APPARATUS FOR PIPING, SUPPORTING INSTRUMENT FOR PIPING AND RETAINING BODY

[75] Inventor: Shouji Okada, Aichi, Japan

[73] Assignee: Kyokuto Kogyo Kabushiki Kaisha, Aichi, Japan

[21] Appl. No.: 614,916

[22] Filed: Nov. 16, 1990

[30] Foreign Application Priority Data

Nov. 17, 1989 [JP] Japan .................................. 1-300028

[51] Int. Cl.⁵ .......................................... E21F 17/02
[52] U.S. Cl. ........................................ 248/59; 248/68.1
[58] Field of Search ............... 248/49, 58, 59, 62, 248/65, 68.1, 73, 74.1, 74.3, 125, 327, 295.1, 297.3; 174/68.2

[56] References Cited

U.S. PATENT DOCUMENTS

| 618,603 | 1/1899 | Henneman | 248/59 |
|---|---|---|---|
| 631,887 | 8/1899 | Clark | 248/59 |
| 2,394,518 | 2/1946 | Kindorf | 248/68.1 |
| 2,732,764 | 1/1956 | Parks | 248/125 X |
| 2,931,605 | 4/1960 | Kelly | 248/59 |
| 2,972,460 | 2/1961 | Kenyon | 248/68.1 X |
| 3,854,684 | 12/1974 | Moore | 248/68.1 |
| 3,938,767 | 2/1976 | Norris | 174/68.2 |
| 4,460,139 | 7/1984 | Bochen | 248/68.1 |
| 4,524,936 | 6/1985 | Hurtubise | 248/68.1 X |
| 4,901,958 | 2/1990 | Kelso | 248/62 X |

FOREIGN PATENT DOCUMENTS

| 2326606 | 4/1977 | France | 248/68.1 |
|---|---|---|---|
| 272392 | 3/1951 | Switzerland | 248/68.1 |

Primary Examiner—J. Franklin Foss
Attorney, Agent, or Firm—Flynn, Thiel, Boutell & Tanis

[57] ABSTRACT

Elongated objects, such as pipes, are supported by supporting apparatus, supporting instruments and retainers in which a foundation body is adapted to be supported on a fitting, such as an anchor bolt. The foundation body is a sidewardly opening channel member, the sidewalls of which have openings therethrough and a slot communicating with the opening so that the fitting can be placed therein. A pressing member is provided to press the fitting against the edge of its associated hole.

16 Claims, 18 Drawing Sheets

SUPPORTING APPARATUS FOR PIPING, SUPPORTING INSTRUMENT FOR PIPING AND RETAINING BODY

BACKGROUND OF THE INVENTION

1. Field of the Invention

The present invention relates to a supporting apparatus for piping, a supporting instrument for piping and a retaining body, more particularly to a supporting apparatus for piping, a supporting instrument for piping and a retaining body that makes it possible to easily fix a pipe arrangement of, for example, cooling equipment, heating equipment and the like through fittings such as anchor bolts and the like to the ceiling of a building and the like.

2. Prior Art

There has been known a method of fixing pipe arrangements by driving, for example, many plug bolts, anchor bolts, inserted metal fittings and the like into a ceiling, a wall and the like at intervals of about 1 to 1.5m, covering the predetermined portion of the arranged pipes with the clamp belt which is shaped in a circle according with the shape of the pipes substantially, and tightening both ends of the clamp belt by bolts so that the pipe lines are statically arranged.

With such a method of pipe arrangement, it is necessary for positioning the row of the pipes to respectively cover the predetermined portions of the arranged pipes and to drive the bolts one by one. Particularly, in the case of arranging pipes along a ceiling surface, in a conventional method, workers have to tighten the bolts of clamp bands which cover the predetermined portions of the pipes with both hands above their heads. Therefore the workers have become remarkably tired.

Such a method of pipe arrangment is inefficient, takes a longtime increase the working time of a worker by one hour and it is difficult to achieve the operation by one worker.

There has been known a method of fixing plural pipe arrangements at the same time by confrontingly arranging each fitting on lines, bridging the coupling members between the fittings, fixing with nuts and the like, and fixing the plural pipe arrangements on the coupling members. With such a method, at the time of installing more pipes, it is inefficient because the coupling members are fixed to the fitting newly driven into and fixed to the ceiling and the like, or the constructed coupling members are detached from the fittings and the coupling members are fitted to the upper position and the lower position of the same fittings again.

SUMMARY OF THE INVENTION

It is therefore an object of the present invention to provide a supporting apparatus for piping, a supporting instrument for piping and a retaining body enabling workers to save time and labor so that the job efficiency is increased, the job time is shortened, and the working time of a worker is reduced by one hour.

To achieve the above objects, the present invention comprises a retaining body that make it possible to fix pipes in an arbitrary position of fittings, such as an anchor bolt by a one touch operation in order to save trouble of the operation, raise the job efficiency, and save cost, whether the piping is established newly or is an addition to established piping.

The above and other objects, features and advantages of the present invention will become more apparent from the following description when taken in conjunction with the accompanying drawings in which preferred embodiments of the present invention are shown by way of illusrative examples.

DESCRIPTION OF THE PREFERRED EMBODIMENT

Figure 1:
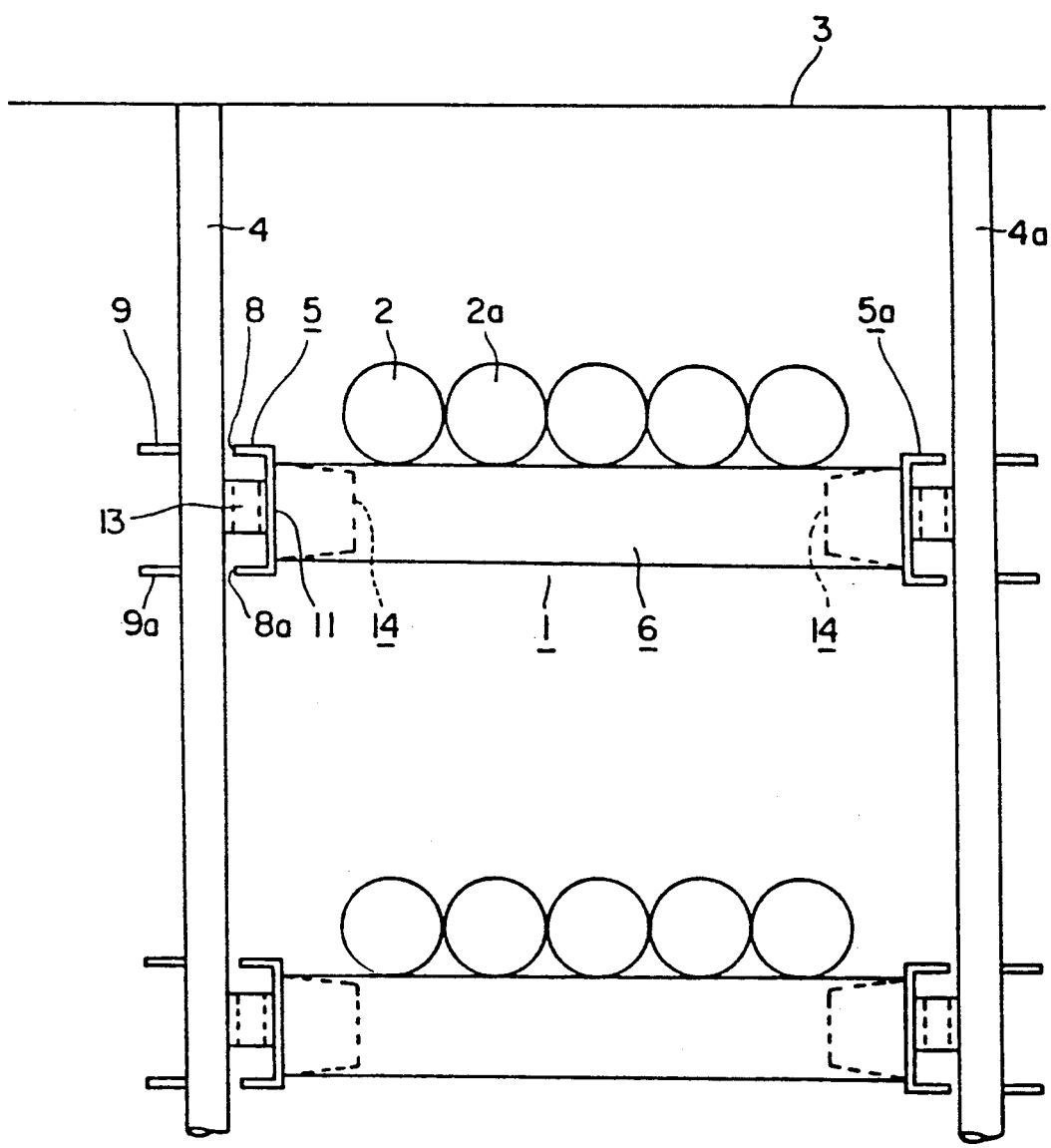
FIG. 1 is a front view of a supporting apparatus according to the present invention.
Figure 2:
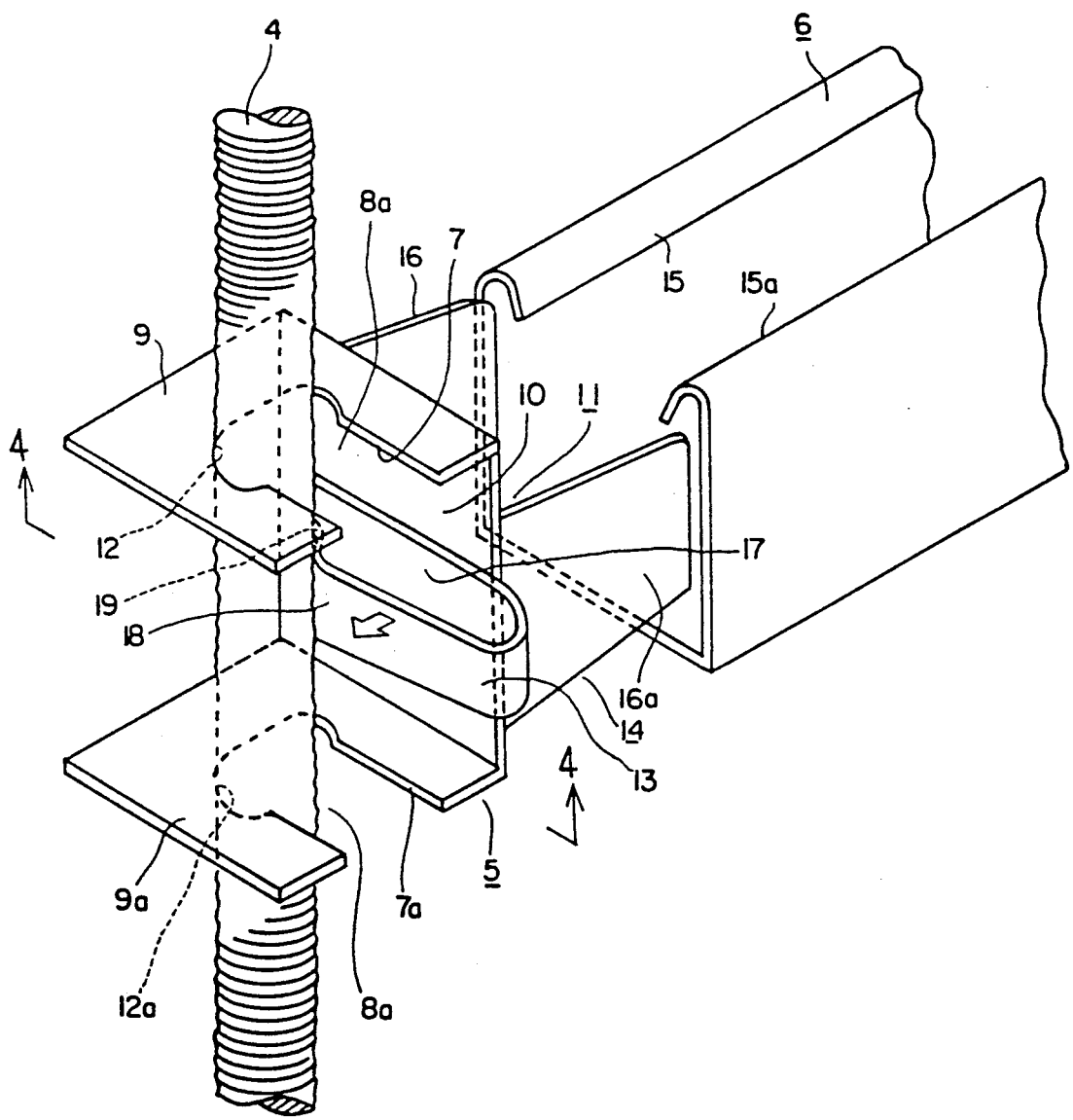
FIG. 2 is a perspective view of a supporting apparatus according to the present invention.

A supporting apparatus for piping, a supporting instrument for piping and a retaining body according to the present invention will be described with reference to FIG. 1 to FIG. 28.

The numeral 1 represents a supporting apparatus supporting plural fixed members 2, 2a, such as pipes and the like for cooling equipment, heating equipment and the like. The supporting apparatus 1 for piping comprises retaining bodies 5, 5a fixed to fittings 4, 4a such as anchor bolts and the like facing each other and driven into a wall surface 3 such as a ceiling and the like of a building with a predetermined space, and a coupling body 6 provided between the retaining bodies 5 and 5a.

The retaining bodies 5, 5a respectively comprise a foundation body 11 and a pressing member 13. The foundation body 11 is a channel-shaped member composed of respectively and opposingly arranged upper and lower fixing pieces or walls 9, 9a, and a connecting piece or wall 10 connecting the fixing pieces 9, 9a in the manner to form said foundation body 11 in a sidewardly opening channel shape. And the fixing pieces 9, 9a are provided with inserted ports 8, 8a having opened portions or slots 7, 7a through with the fittings 4, 4a are inserted from the side. And the pressing member 13 presses the fittings 4, 4a inserted into the inserted ports 8, 8a toward the thin engaging portions 12, 12a around of the edge of the ports 8, 8a so that the thin edge engages the threads of the fittings 4, 4a.

If the thickness of the foundation body 11 engages with the slots of the fitting member 4, 4a, the engaging portions 12, 12a do not need to be thinned.

The numeral 14 identifies an upwardly opening locking portion which is formed in a substantial sidewardly-opening channel shape at the cross section thereof. The locking portion 14 fits in the end portion of an elongated coupling body 6 provided with inverted U-shaped flanges 15, 15a which extend inwardly from the perimeter of the body. The locking portion 14 comprises projecting locking pieces 16, 16a which projects from both side ends of the foundation body 11 in the opposite direction from the fixing pieces 9, 9a. The locking pieces 16 and 16a are tapered in the outward direction.

If it is possible to lock the fitting portion 14 into the coupling body 6, the shape of the fitting portion 14 and the coupling body 6 may be in any shape. Furthermore, the fitting portion 14 may be rotatably mounted on the foundation body 11.

Figure 3:
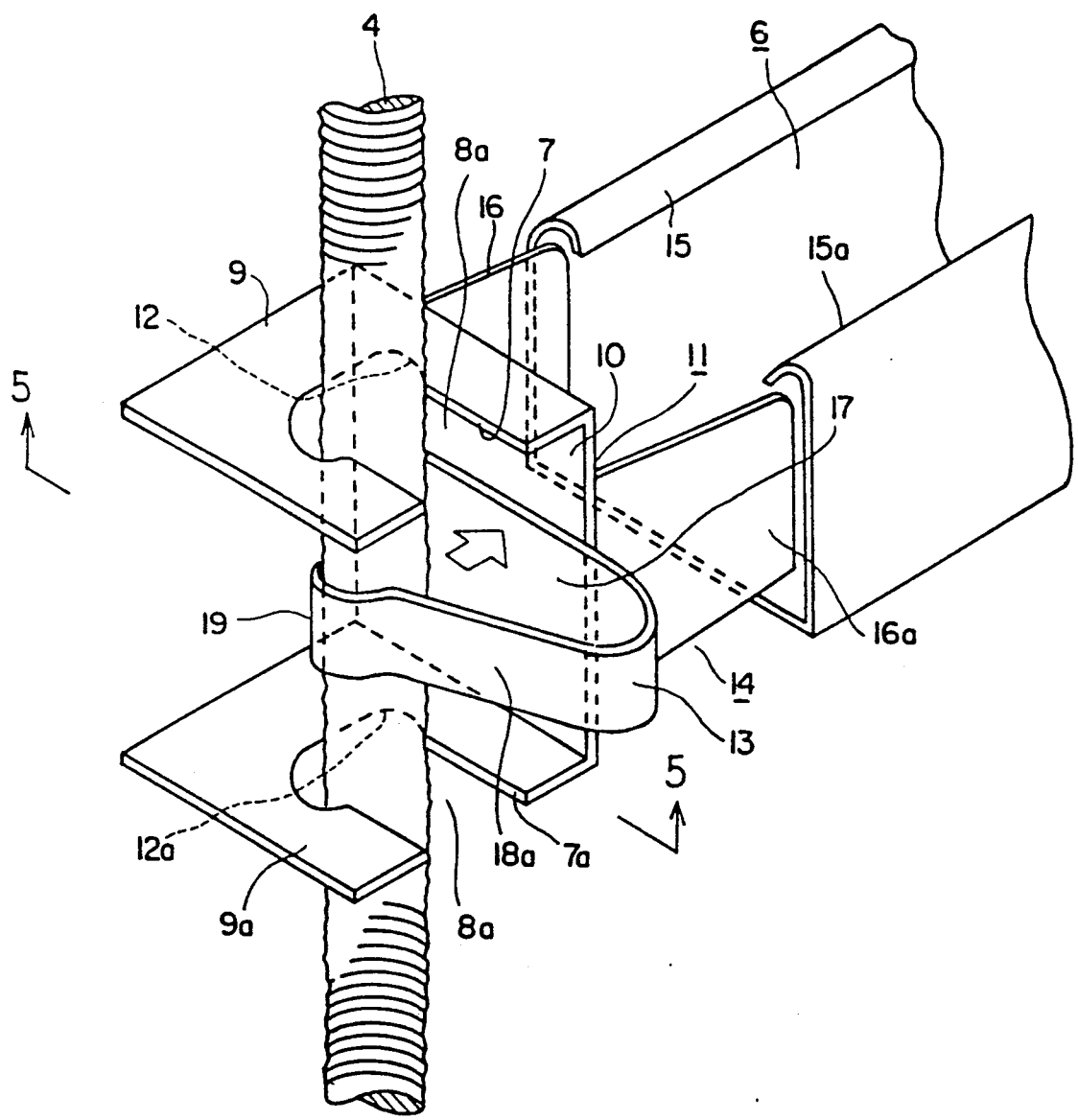
FIG. 3 is a perspective view of another embodiment of a supporting apparatus according to the present invention.

The pressing member 13 is formed in a U-shape of a plate spring member made of metal or the like. The pressing member 13 has a pressing piece 17 for the retaining body 5 at one end thereof, a pressing piece 18 for the fitting 4 at the other end thereof, and a bent portion formed between the pressing pieces 17 and 18. The pressing piece 18 and pressing piece 17 are elastically urged toward or away from each other, namely the mutual separating direction (FIG. 2) or the mutual approaching direction (FIG. 3). The pressing piece 18 has concave supporting member 19 concaved at the for engaging the fitting 4.

The pressing member 13 is detachably installed between the fitting 4 and the connecting piece 10 of the basic body 11, or fixedly installed by fixing the pressing piece 17 of the pressing member 13 to the connecting piece 10.

Figure 4:
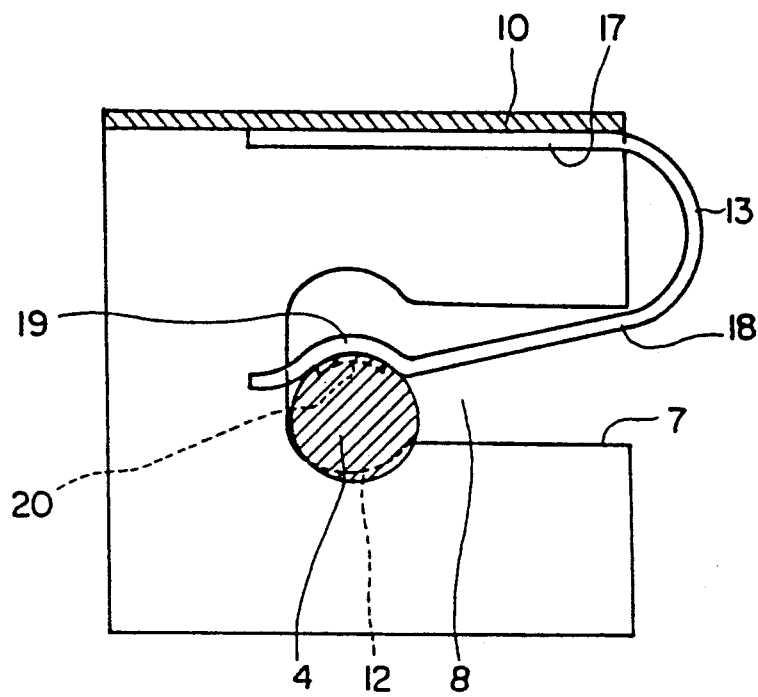
FIG. 4 is a cross sectional view of a supporting apparatus taken along line 4—4 of FIG. 2.
Figure 5:
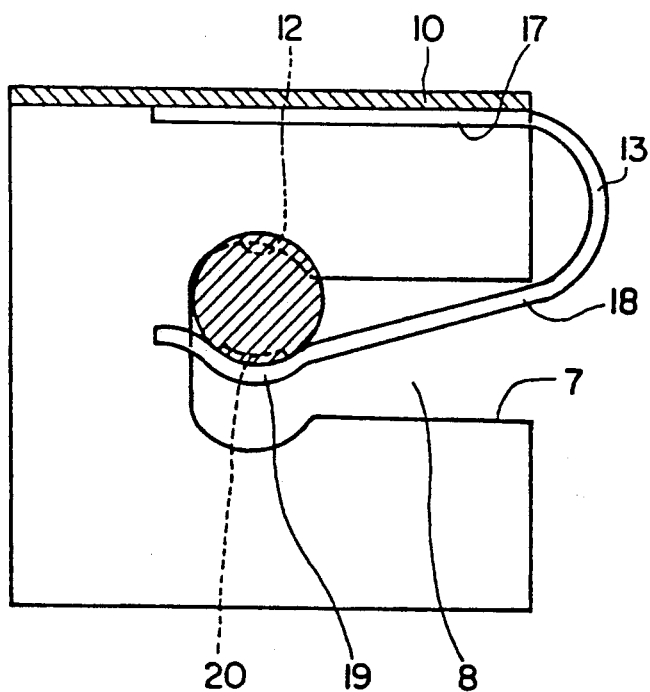
FIG. 5 is a cross sectional view of a supporting apparatus taken along line 5—5 of FIG. 3.
Figure 6:
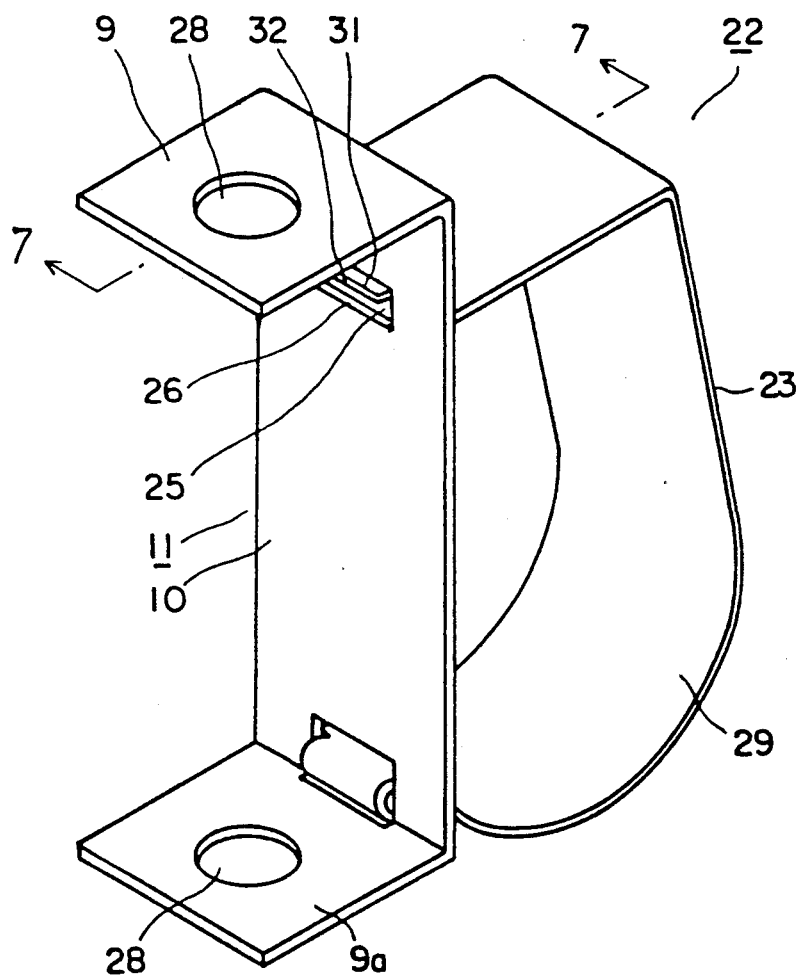
FIG. 6 is a perspective view of a supporting instrument for piping according to the present invention.
Figure 7:
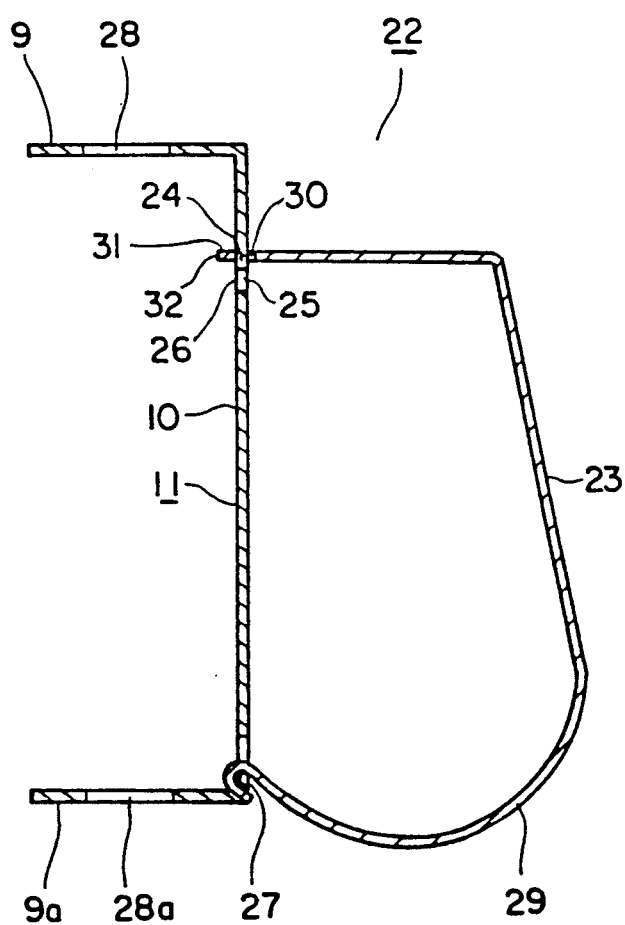
FIG. 7 is a cross sectional view taken along line 7—7 of FIG. 6.
Figure 8:
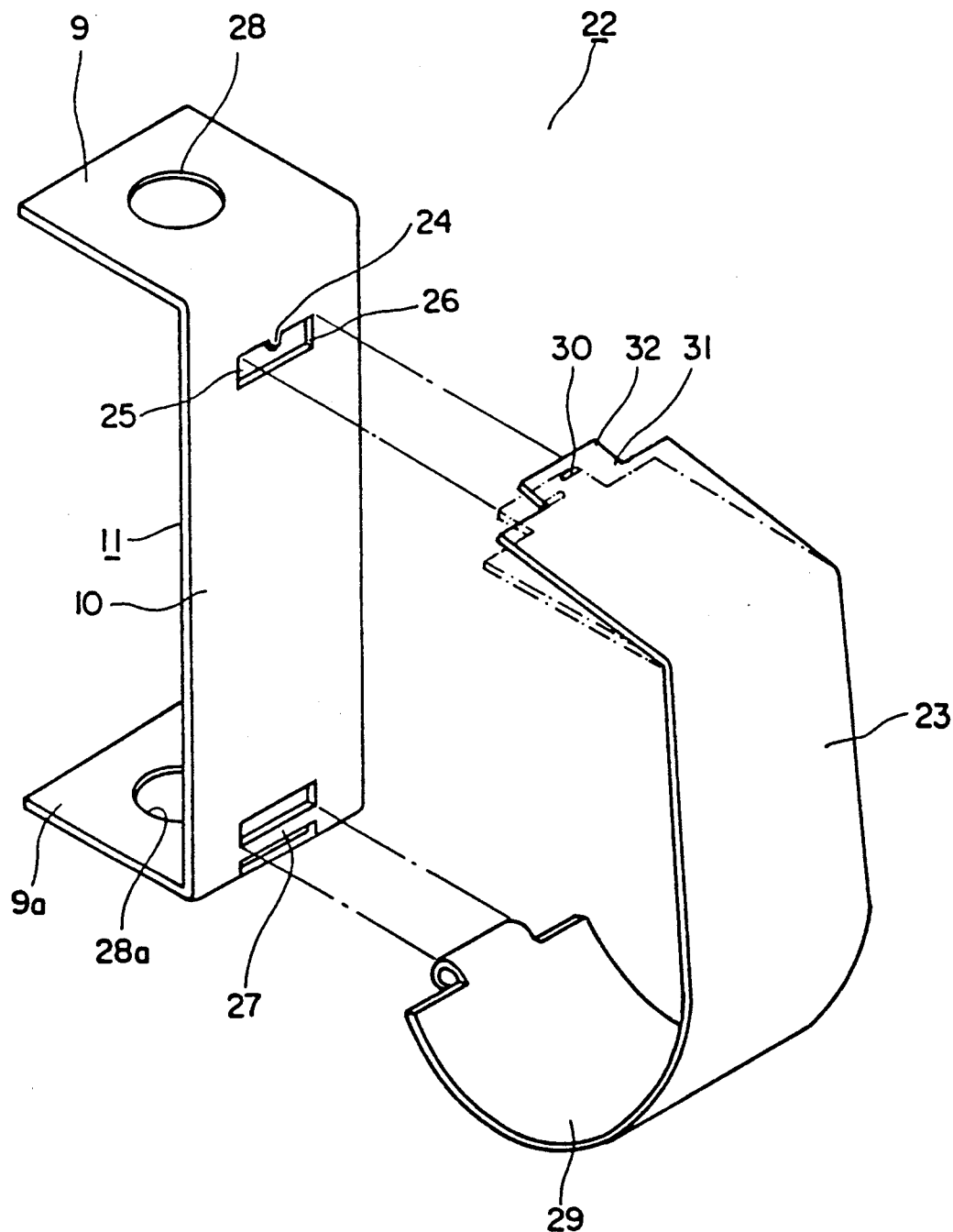
FIG. 8 is a exploded perspective view of the supporting instrument for piping according to the present invention.

Referring to FIGS. 4 and 5, numeral 20 represents a projecting piece. The projecting piece 20 is thin and projects from the detachable supporting member 19 so as to engage with the slot of the fittings fitting 4 in order to ensure the support of the fitting 4.

In the case of using a pressing member 13 in which the pressing piece 17 and pressing piece 18 are resiliently to urged toward each other, it is unnecessary to provide inserting ports 8, 8a in the fixing pieces 9, 9a. And it is possible that the outer end portion of the fixing pieces 9, 9a serve the purpose of the engaging portions 12, 12a. Furthermore, it is possible that plural projecting pieces 21 (FIGS. 26 and 28) are projectingly provided at the upper and lower positions of the connecting piece 10 of the basic body 11 in order to lock with the slots of the fitting 4. And it is possible that the projecting piece 21 is projectingly provided at the pressing piece 17 of the pressing member 13, and the plural pressing member 13 is fixed at the upper and lower portions of the connecting piece 10 of the basic body 11.

A supporting instrument 22, which individually supports the fixed members 2, 2a ... of the pipe arrangement and the like of, for example, cooling equipment, heating equipment and the like, is fixed to the fittings 4, 4a such as anchor bolts or the like driven into the wall surface 3 such a ceiling or the like of a building or the like. The supporting instrument is provided with a pipe supporting body 23 instead of the fitting portion 14 of the retaining bodies 5, 5a.

The connecting piece 10 of the retaining body 5 is provided with a main fitting port 26 at the upper portion and a rotary stem 27 at the lower portion of the outer surface thereof. The main fitting part 26 is provided with a rectangular port 25, and a click 24 downwardly projecting from the upper portion of the hooked port 25. The rotary stem 27 is widthwise defined by two substantially rectangular ports in order that the rotary stem 27 is disposed in the widthwise direction.

Furthermore, the fixing pieces 9, 9a are penetrated the fittings 4, 4a can be inserted. The ports 28, 28a are used in place of the inserted ports 8, 8a in the previously described embodiment of the invention.

The supporting body 23 comprises a supporting part 29 bent at one end of the band shaped metal plate so as to form a substantial arc-shape. The other end of the supporting body 23 is formed in a cantilever manner so that it is elastic and extends from the supporting member 29 and is bent so as have such an angle that a subordinate fitting part 32 is positioned a little bit above the port 25, namely, bent in order to have a little bigger angle. The right angle. The edge of the fitting part 32 is substantially the same length as the width of the hooked port 25. The subordinate fitting port 32 provides a hooking part 31 penetrated with a fitting port 30 corresponding with the shape of the click 24 provided on the port 25.

The supporting instrument 22 for piping hinges the one end of the supporting body 23 to the rotary stem 27 of the retaining body 5 (the foundation body 11), and detachably locks the hooking part 31 of the supporting body 23 into the hooked port 25 of the retaining body 5 (the foundation body 11).

The supporting body 23 is not limited to a metallic material. It can be made of materials having a high elastic limit at the time when the other end is shaped in a cantilever shape having a high fatigue limit for long life, and having a good supporting strength for the fixed members 2, 2a of piping.

Figure 12:
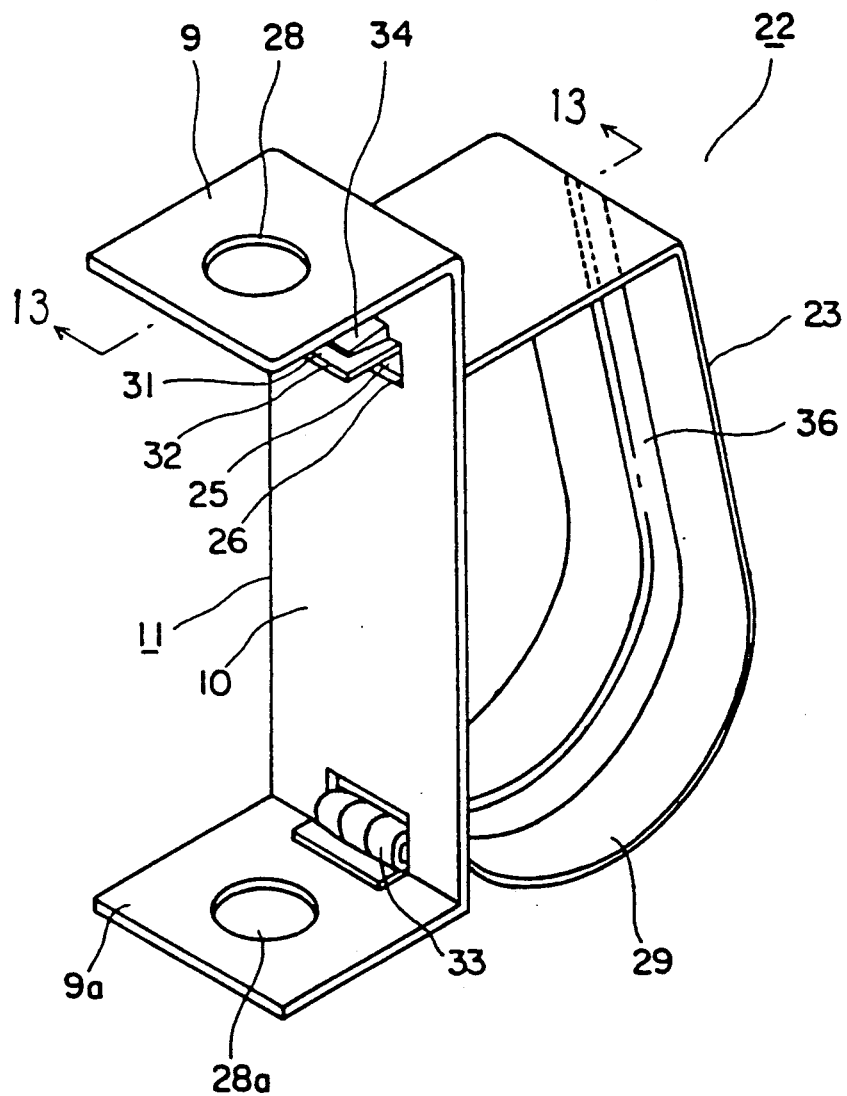
FIG. 12 is a perspective view showing another embodiment of a supporting instrument according to the present invention.
Figure 13:
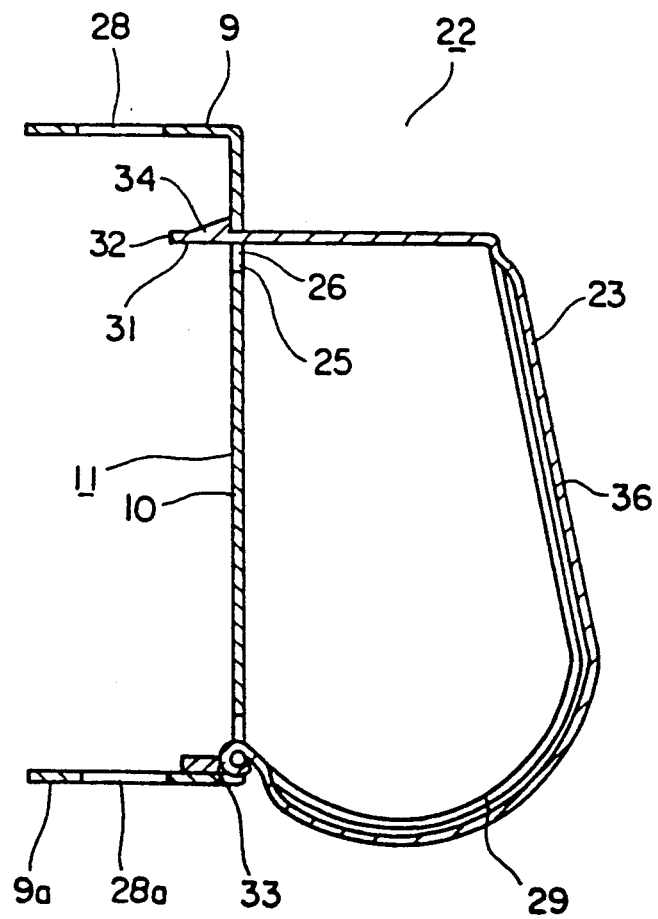
FIG. 13 is a cross sectional view taken along line 13—13 of FIG. 12.

In another embodiment of the supporting body 23, the lower end of the holding body 5 and the one end of the supporting body 23 is hinged by a hinge 33 as shown in FIG. 12 and FIG. 13.

Figure 14:
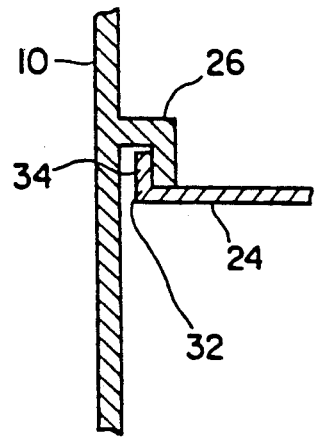
FIG. 14 is a cross sectional view showing another embodiment of a main fitting part and a subordinate fitting part according to the present invention.
Figure 15:
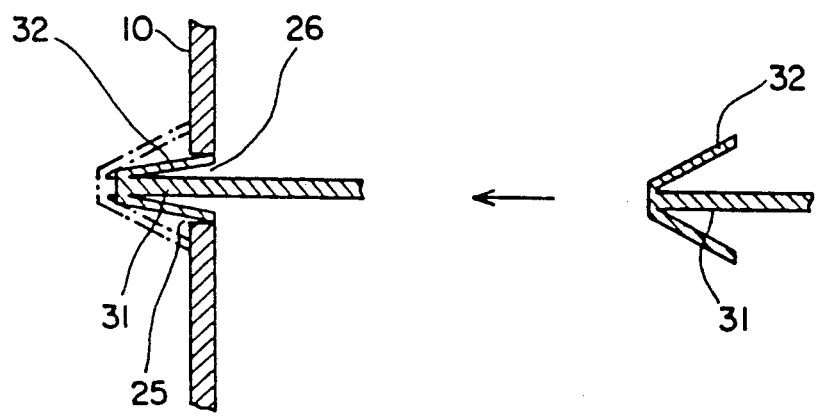
FIG. 15 is a cross sectional view showing another embodiment of a main fitting part and a subordinate fitting part according to the present invention.
Figure 16:
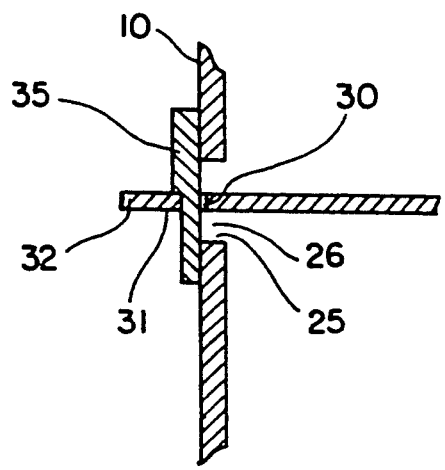
FIG. 16 is a cross sectional view showing another embodiment of a main fitting part and a subordinate fitting part according to the present invention.

The structure of the main fitting part 26 and the subordinate fitting part 32 are not limited. For example, the main fitting part 26 can be formed by penetrating the hooked port 25 of the basic body 11 in the manner of a rectangular shape having a predetermined space in the lengthwise direction, and the hooking part 31 of the supporting body 23 is provided with an upwardly projected click 34 as a subordinate fitting part 32 as shown in FIG. 12, and FIG. 13. It is also possible to provide the main fitting part 26 by projecting an L-shaped projection in the manner of carpenter's square and providing the click 24 at a portion close to the upper end of the connecting piece 10 of the basic body 11, and then the subordinate fitting part 32 is erectly provided with the click 34 at the end of the hooking port 31 of the supporting body 23 for piping as shown in FIG. 14. Furthermore, as shown in FIG. 15, it is possible to provide a main fitting part 26 provided with the port 25 with a predetermined space lengthwise of the connecting piece 10, and a hooked part 31 as a substitute for of the subordinate fitting part 32 is slantly and projectingly provided in the manner to provide the hooked part 31 which has elasticity in order to enlarge the diameter after passing through the hooked port 25 of the main fitting part 26 as shown in FIG. 15. Still furthermore, as shown in FIG. 16, it is possible to use a hooked member 35 such a pin and the like. Accordingly, it may be so long as the main fitting part 26 and the subordinate fitting part 32 are enabled to be detached and locked.

Figure 17:
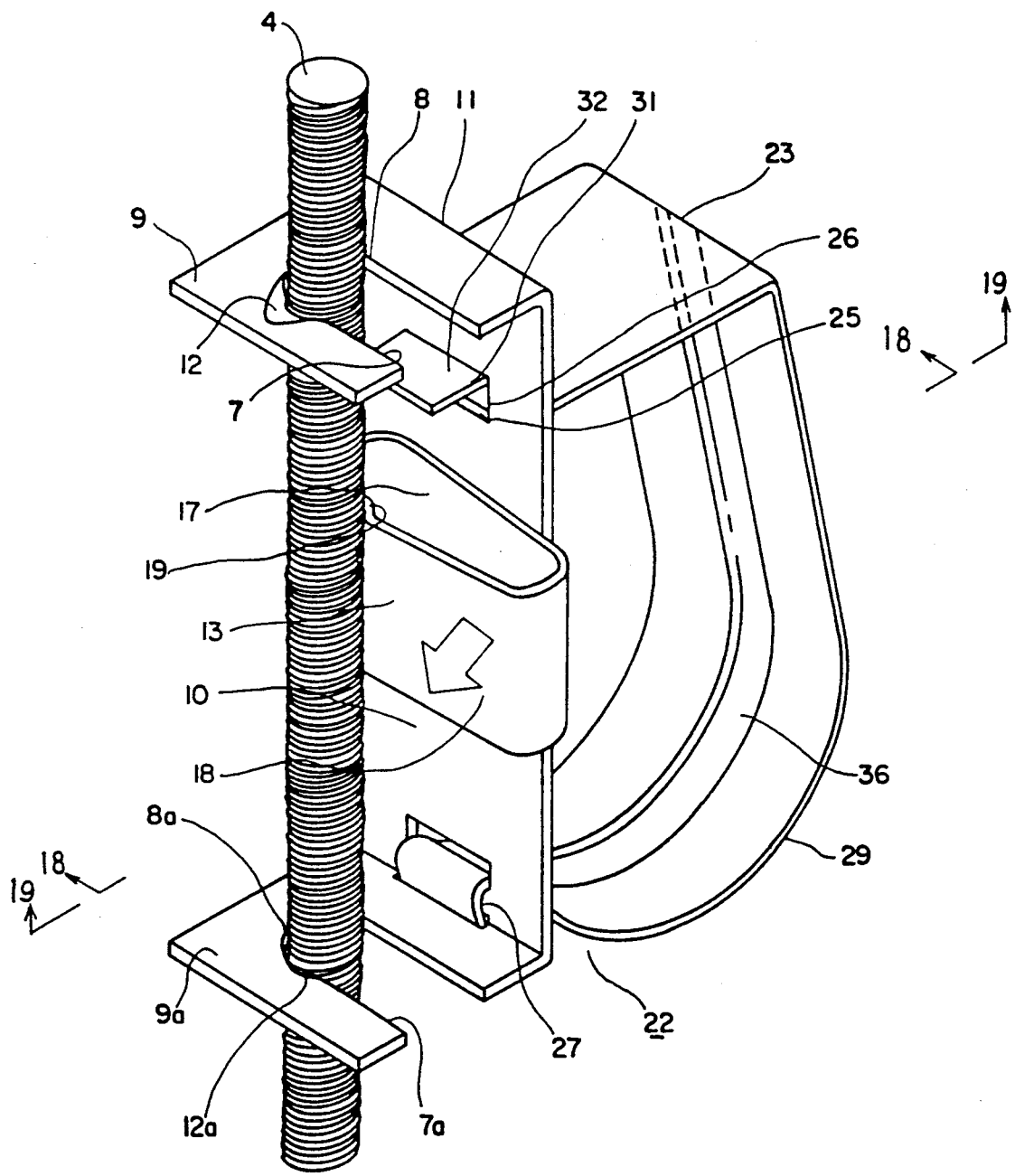
FIG. 17 is a perspective view of a supporting instrument provided with a pressing member according to the present invention.
Figure 18:
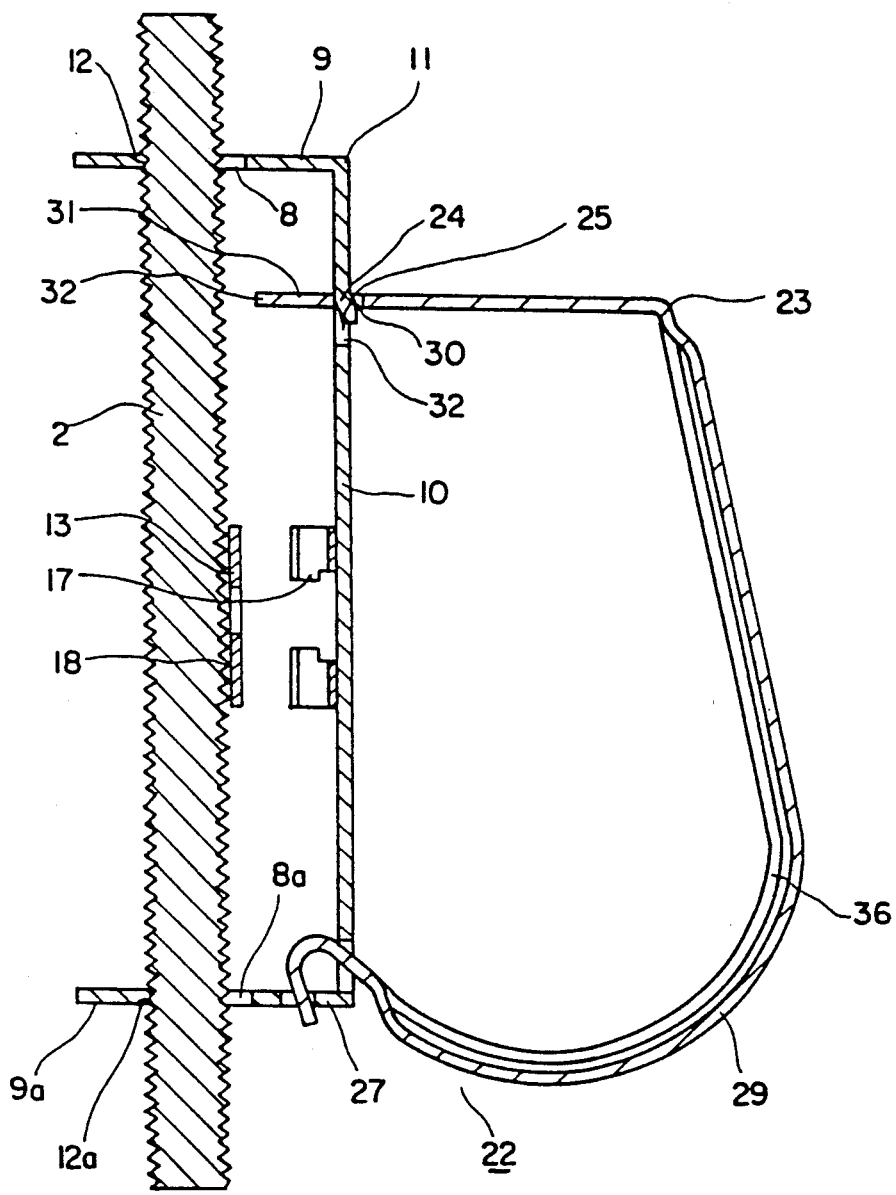
FIG. 18 is a cross sectional view taken along line 18—18 of FIG. 17.
Figure 19:
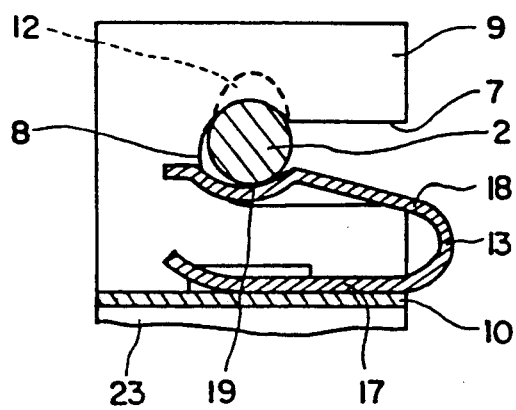
FIG. 19 is a cross sectional view taken along line 19—19 of FIG. 17.
Figure 20:
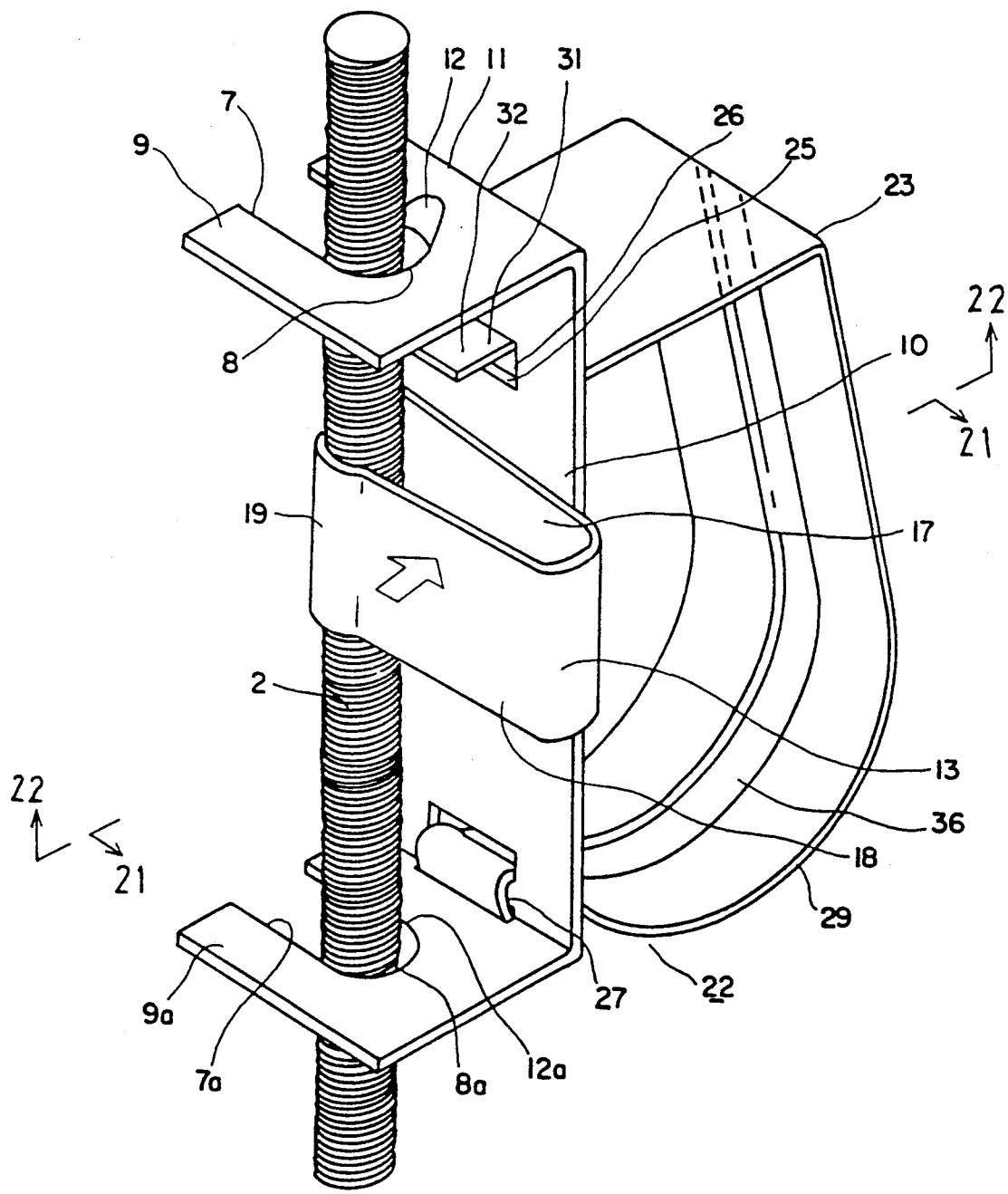
FIG. 20 is a perspective view of another supporting instrument provided with a pressing member according to the present invention.
Figure 21:
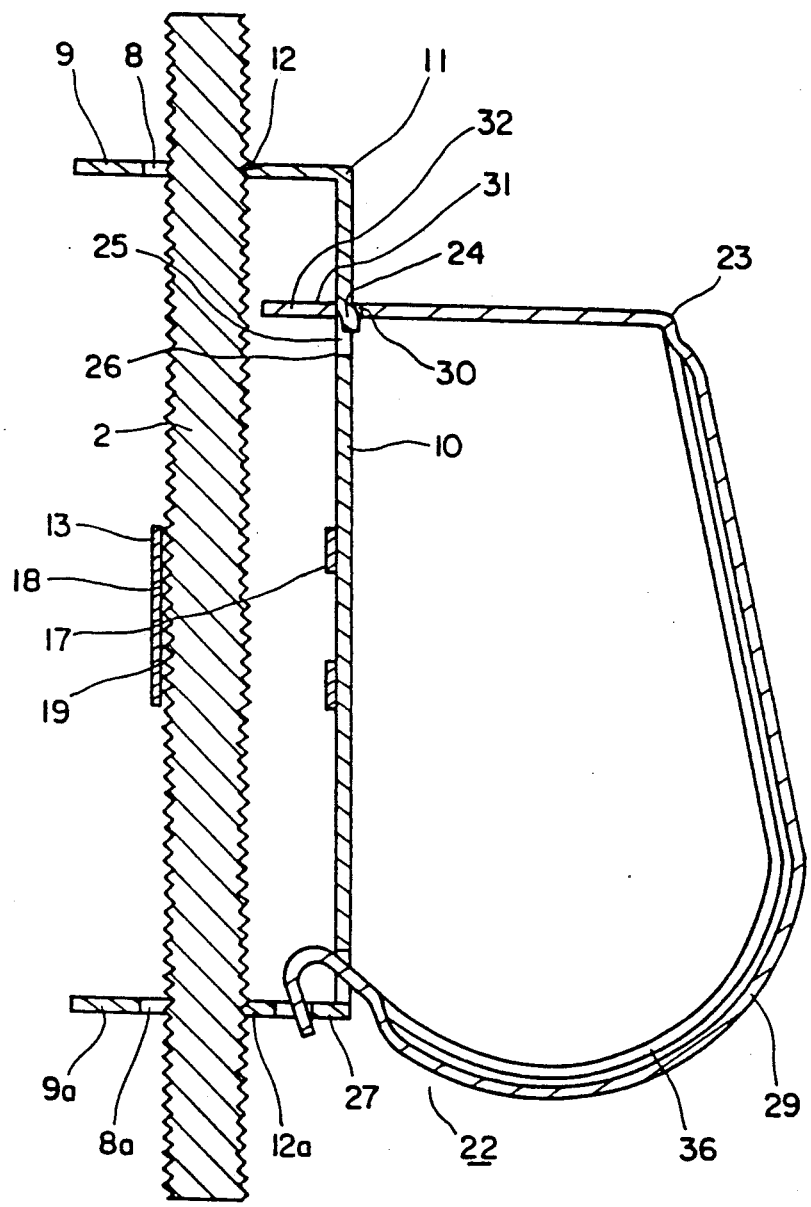
FIG. 21 is a cross sectional view taken along line 21—21 of FIG. 20.
Figure 22:
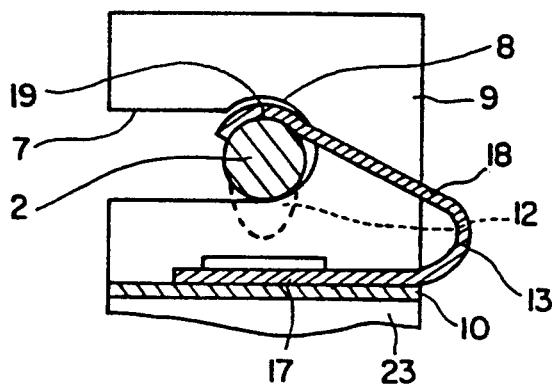
FIG. 22 is a cross sectional view taken along line 22—22 of FIG. 20.
Figure 23:
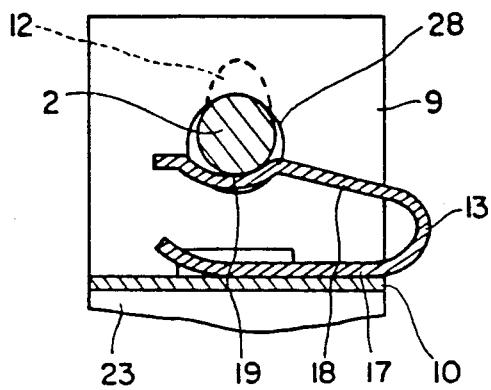
FIG. 23 is a horizontal cross sectional view of a principal part of another embodiment of a retaining body fixed to a fitting member by a pressing member according to the present invention.
Figure 24:
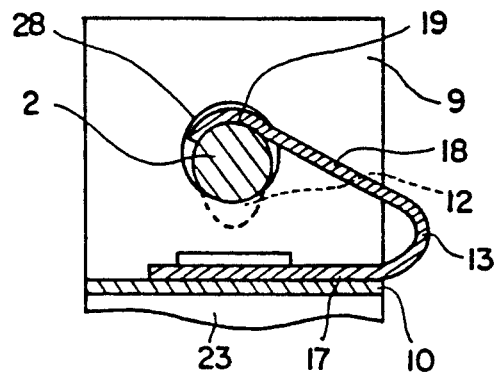
FIG. 24 is a horizontal cross sectional view of a principal part of a retaining body fixed to a fitting member by a pressing member according to the present invention.
Figure 25:
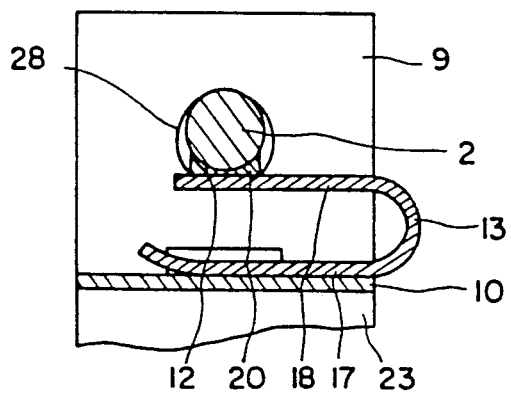
FIG. 25 is a horizontal sectional view of a principal portion of another embodiment of a principal portion of a holding body fixed to the fitting member by the pressing member according to the present invention.
Figure 26:
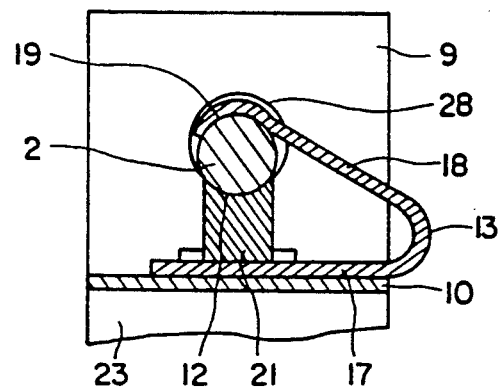
FIG. 26 is a horizontal cross sectional view of a principal part of another embodiment of a retaining body fixed to a fitting member by a pressing member according to the present invention.
Figure 27:
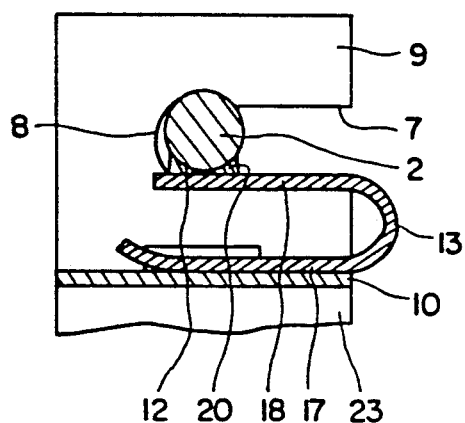
FIG. 27 is a horizontal sectional view of a principal part of another embodiment of a retaining body fixed to fittings by a pressing member according to the present invention.
Figure 28:
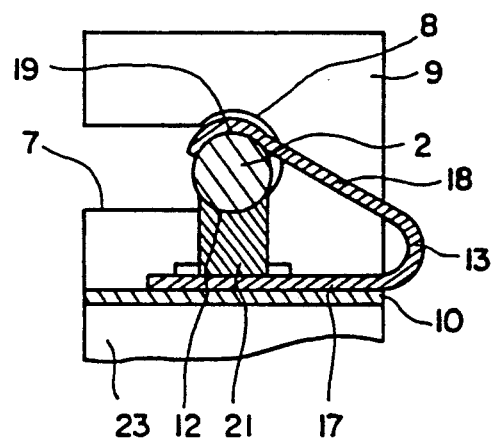
FIG. 28 is a horizontal sectional view of a principal part of another embodiment of a retaining body fixed to fittings by a pressing member according to the present invention.

As shown in FIG. 17, the strengthening ridge for the supporting body 23 for pipes, the rim 36 is outwardly expanded and shaped in the supporting member 29.

FIGS. 18-28 illustrate additional embodiments of the invention wherein the reference numbers refer to the same parts as described above. Accordingly, it is believed to be unnecessary to discuss each of these figures.

An operation of the supporting apparatus for piping, according to the present invention will be described hereafter.

The fitting portions 14, 14 of the retaining bodies 5, 5a are locked into the both ends of the coupling body 6. The fittings 4, 4a are inserted into the inserted ports 8, 8a of the respective retaining bodies 5, 5a of each unit mentioned above. The pressing members 13 are inserted and positioned between the retaining bodies 5, 5a and the fittings 4, 4a. The pressing piece 18 and the pressing piece 17 resiliently press against the fittings 4, 4a and said fittings are engaged with the detachable supporting member 19 of the pressing member 13. Accordingly, by the elastic force of the pressing member 13, the fitting members 4, 4a are pressed against the engaging portions 12, 12a of the circumference of the inserting ports 8, 8a of the fixing pieces 9, 9a, and the retaining bodies 5, 5a are locked into the slot of the fittings 4, 4a in the manner to be pinched and supported in the predetermined position.

When the pressing piece 17 of the pressing member 13 is previously fixed to the holding bodies 5, 5a, the fitting members 4, 4a are slid along the surface of the pressing piece 18 with contracting and releasing the pressing member 13, and are inserted into the inserted ports 8, 8a to the position where the fittings 4, 4a are locked into the detachable supporting member 19. Accordingly, the holding bodies 5, 5a are fixed to the determined position in the manner mentioned above.

Furthermore, in the case of using the pressing member 13 comprising the pressing piece 18 for the fittings 4, 4a and the pressing piece 17 for the retaining bodies 5, 5a which are resiliently urged toward each other, namely, in opposite directions, the operation comprises following steps. Previously the pressing piece 18 for the fittings 4, 4a is enlarged and opened, the fittings 4, 4a are inserted into the inserted ports 8, 8a of the fixing pieces 9, 9a, and then the pressing piece 18 is released from the enlarged and opened condition. Secondly the fittings 4, 4a are pressed to the engaging portions 12, 12a provided in the circumference of the inserted ports 8, 8a of the fixing pieces 9, 9a by elasticity while the fittings 4, 4a engage with to the detachable supporting member 19 of the pressing piece 18. Accordingly, the retaining bodies 5, 5a are fixed to the predetermined position.

Furthermore, when the connecting piece 10 of the foundation body 11 is provided with a projecting piece 21, or when the pressing member 13 is provided with a projecting piece 20, the projecting pieces 20, 21 are engaged with the slot of the fittings 4, 4a. Accordingly, the retaining bodies 5, 5a are fixed to the determined position in the same manner mentioned above.

As a result, the supporting apparatus 1 is fixed to the fittings 4, 4a, and the plural fixed members 2, 2a ... are fixedly mounted and arranged on the coupling bodies 6, 6a.

An operation of the supporting instrument for piping according to the present invention will be described hereafter.

Figure 9:
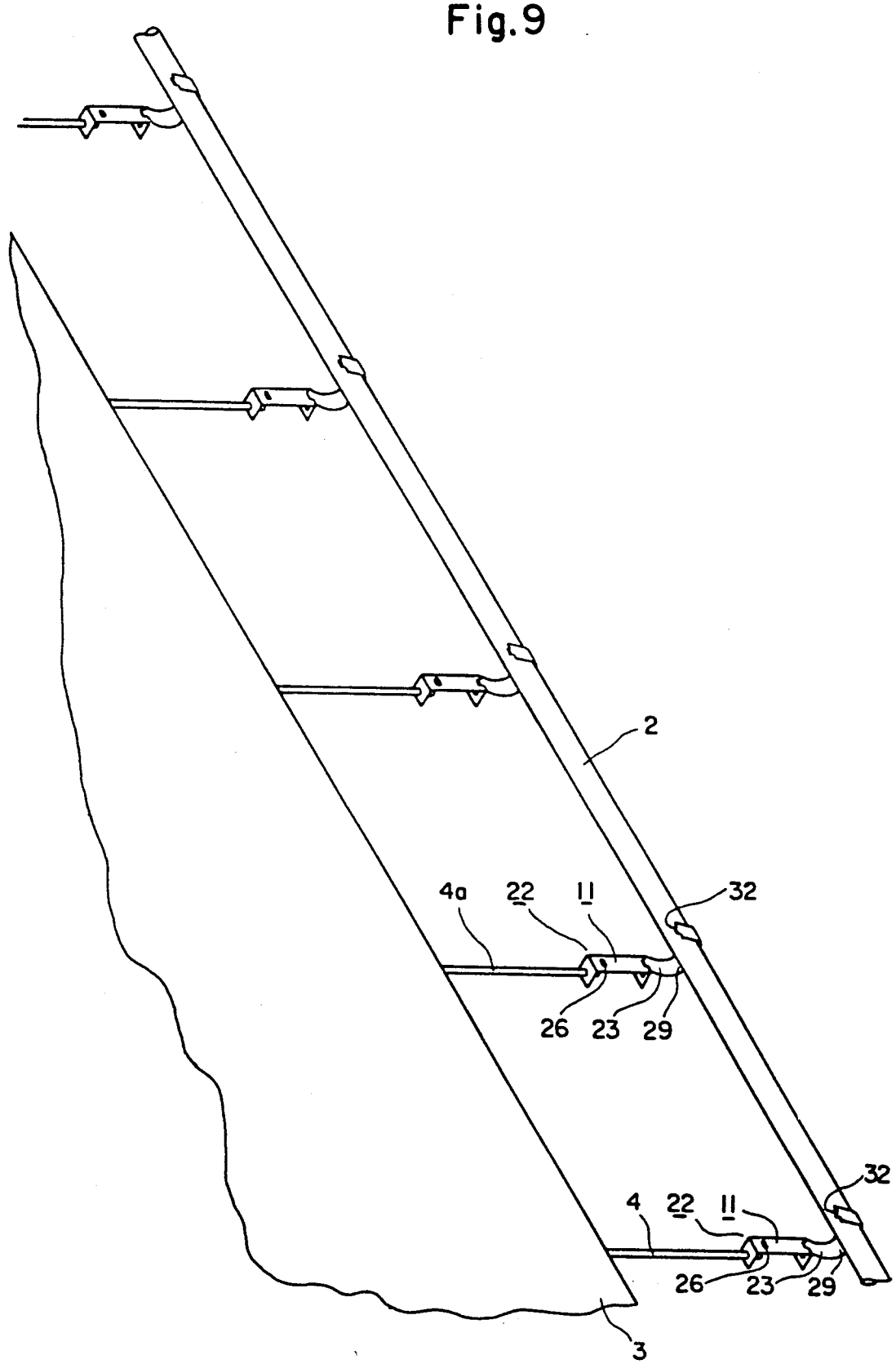
FIG. 9 is a perspective view of a temporary piping and supporting manner of a supporting instrument according to the present invention.
Figure 10:
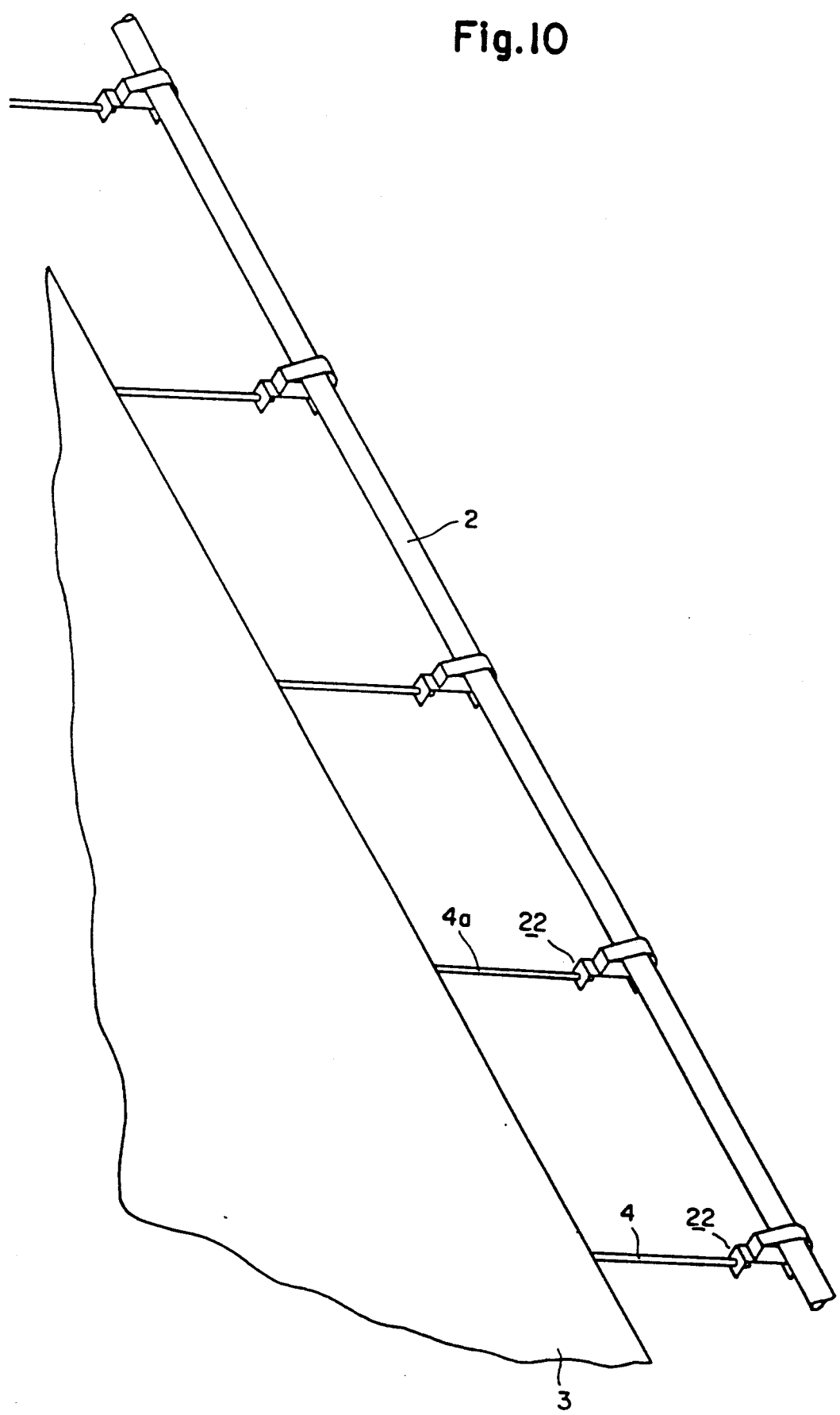
FIG. 10 is a perspective view showing a manner of a supporting instrument according to the present invention.

When the supporting instrument 22 for piping of which the fixing pieces 9, 9a of the basic body 11 has the penetrated ports 28, 28a, and the operation comprises the following. The fittings 4, 4a, such as anchor bolts, are driven into the wall surface 3 with predetermined spaces are inserted into the penetrated ports 28, 28a. The supporting instrument 22 is temporarily fixed by being regulated at the height of the each supporting instrument 22 in order to be positioned at substantially same height with proper nut members (not shown). And then, as shown in FIG. 9, in the first place, while the subordinate fitting part 32 of the supporting body 23 for piping is detached from the main fitting part 26 of the foundation body 11, the fixed member 2 of pipes is mounted on the supporting part 29 of the supporting body 23 for piping. Finally, the height of the supporting instrument 22 is adjusted and fixed.

Accordingly, the hooked port 25 of the main fitting part 26 of the foundation body 11 is fitted in the hooking part 31 of the subordinate fitting part 32 of the supporting body 23.

In the manner mentioned above, as the other end of the supporting body 23 is provided with elasticity in the manner of being cantilever, the hooking part 31 of the subordinate fitting part 32 is brought into contact with the one side of the upper portion of the hooked port 25, and the click 24 of the hooked port 25 fits in the locking port 30 of the hooking part 31. Accordingly, the foundation body 11 is stably locked into the supporting body 23 for piping.

Figure 11:
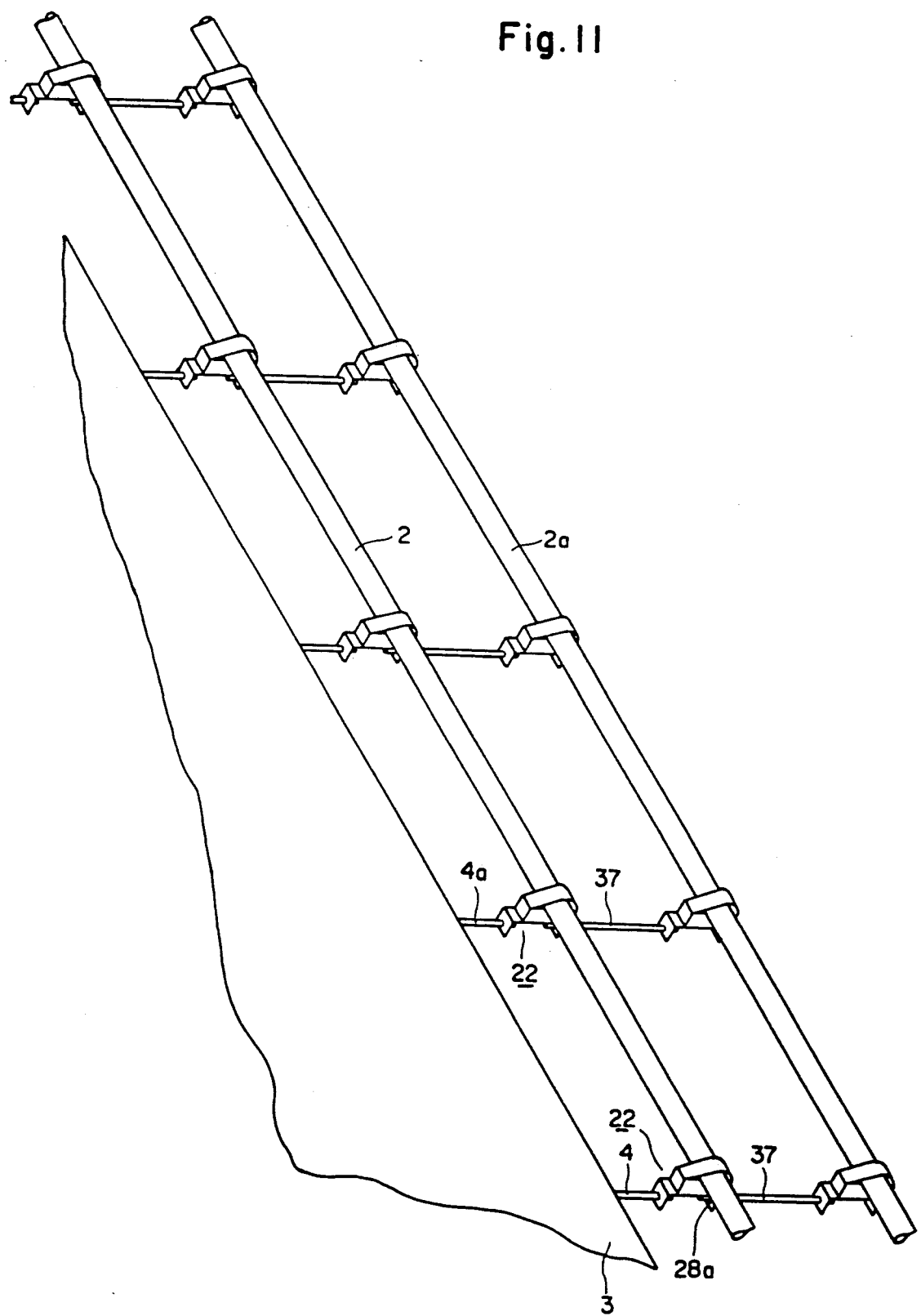
FIG. 11 is another perspective view showing another manner of a supporting instrument according to the present invention.

As shown in FIG. 11, as the occasion demands, the bolt 37 is inserted into and fixed to the inserting port 8a of the lower side of the basic body 11, and then, it is possible that another fixed member 2 for piping and the like is arranged by disposing the supporting instrument 22 in the same manner as described mentioned above.

Description of the supporting instrument 22 fixing the fittings 4, 4a in the basic body 11 by the pressing member 13 is omitted, as it is the same operation as the retaining bodies 5, 5a of the supporting apparatus 1 for piping mentioned above.

As mentioned above, the slot of the fittings 4, 4a is locked, fitted and fixed in the gapped passages 8, 8a of the fixing pieces 9, 9a by means of the resiliency of the pressing member 13 by a one touch operation which the fittings 4, 4a are only inserted into the gapped passages 8, 8a without the operations such as newly fixing the fittings 4, 4a, detaching the already constructed coupling members, and refitting. And then, whether the piping is established newly or is an addition to established piping, the job efficiency is raised and cost is saved when the fixed members 2, 2a ... such as pipes for piping are arranged.

Furthermore, at the time of indoor piping of the building, the height of the foundation body 11 is finally adjusted after the foundation body 11 is temporarily fixed to the fittings 4, 4a, such as anchor bolts and the like, and the fixed member 2 of piping is mounted on the supporting body 23 for piping. And after the temporary adjustment, by only fitting and hooking the main fitting part 26 of the supporting body 23 for piping with the subordinate fitting part 32 of the foundation body 11, the foundation body 11 is not detached from the supporting body 23 for piping because of the elasticity of the supporting body 23. Without using clamping members such as bolts, nuts and the like, as in conventional methods, it is possible to cover and fix the pipes by a one touch operation. Therefore, the working burden is lightened, the working efficiency is increased and the working time is reduced. Furthermore, it is possible to reduce expenses. As the supporting instrument for piping does not need bolts and nuts, the instrument is manufactured in low cost.

Furthermore, the foundation body 11 is securely and easily fixed to the fittings 4, 4a in the manner to be pitched and supported by the elasticity of the pressing member 13. Accordingly, the working burden is lightened, the working efficiency is increased and the working time is reduced. Furthermore, it is possible to reduce expenses. As the supporting instrument for piping needs not bolts and nuts, the instrument is manufactured in low cost.

It is possible to ensure the fixture in the manner TO pitch and support by the engaging effect of the slot of the fittings 4, 4a and the gapped passages 8, 8a of the fixing pieces 9, 9a.

What is claimed is:

1. A supporting apparatus, comprising:
    two retaining bodies each comprising a foundation body composed of a channel member the open side of which opens in a substantially horizontal direction, said channel member having upper and lower walls and an upright connecting wall extending between two corresponding side edges of said upper and lower walls, said upper and lower walls having vertically aligned holes therethrough, a fitting extending through said holes, said upper and lower walls having slots extending from said holes through two corresponding end edges of said channel member, said slots having a width sufficient to permit the fitting to be moved therethrough into said holes, a leaf spring disposed inside of said channel member, said leaf spring having a pair of legs which extend in the same, substantially horizontal direction and external transverse to the end edges of said upper and lower walls, and a bight extending between and connecting the outer ends of said legs, one of said legs bearing on said upright connecting wall and the other of said legs bearing against the fitting and resiliently pressing it against the edges of said holes, said foundation body also having a fitting portion projecting therefrom; and
    a coupling body having its opposed ends fitted into and supported by said fitting portions.

2. A supporting apparatus as claimed in claim 1 in which said slots extend substantially parallel with said connecting wall, said legs both extend between said upright connecting wall and said holes, said legs being resiliently biased away from each other so that the fitting is resiliently urged away from said upright connecting wall.

3. A supporting apparatus as claimed in claim 2 in which said leaf spring is substantially U-shaped and said bight thereof is disposed outside of said two corresponding end edges of said upper and lower walls.

4. A supporting apparatus as claimed in claim 1 in which said slots extend substantially parallel with said connecting wall, one of said legs extends along said upright connecting wall and the other of said legs extends toward portions of the edges of said holes that are remote from said upright connecting wall so that said other leg bears against the portion of said fitting that is remote from said upright connecting wall, said legs being resiliently biased toward each other so that the fitting is resiliently urged toward said upright connecting wall.

5. A supporting apparatus as claimed in claim 4 in which said leaf spring is substantially V-shaped and said bight thereof is disposed outside of said two corresponding end edges of said upper and lower walls.

6. A supporting apparatus as claimed in claim 1 in which said fitting has a notch therein and the other of said legs of said leaf spring has a projecting piece received in said notch.

7. A retaining body, comprising:
    a foundation body composed of a channel member the open side of which opens in a substantially horizontal direction, said channel member having upper and lower walls and an upright connecting wall extending between two corresponding side edges of said upper and lower walls, said upper and lower walls having vertically aligned holes therethrough for receiving a fitting therethrough, said upper and lower walls having slots extending from said holes through two corresponding end edges of said channel member, said slots having a width sufficient to permit the fitting to be moved therethrough into said holes, a leaf spring disposed inside of said channel member, said leaf spring having a pair of legs which extend in the same, substantially horizontal direction and extend transverse to the end edges of said upper and lower walls, and a bight extending between and connecting the outer ends of said legs, one of said legs bearing on said upright connecting wall and the other of said legs being adapted to bear against the fitting and resiliently press it against the edges of said holes.

8. A retaining body as claimed in claim 7 in which said slots extend substantially parallel with said connecting wall, said legs both extend between said upright connecting wall and said holes, said legs being resiliently biased away from each other so that the fitting can be resiliently urged away from said upright connecting wall.

9. A retaining body as claimed in claim 8 in which said leaf spring is substantially U-shaped and said bight thereof is disposed outside of said two corresponding end edges of said upper and lower walls.

10. A retaining body as claimed in claim 7 in which said slots extend substantially parallel with said connecting wall, one of said legs extends along said upright connecting wall and the other of said legs extends toward portions of the edges of said holes that are remote from said upright connecting wall so that said other leg is adapted to bear against the portion of said fitting that is remote from said upright connecting wall, said legs being resiliently biased toward each other so that the fitting is resiliently urged toward said upright connecting wall.

11. A retaining body as claimed in claim 10 in which said leaf spring is substantially V-shaped and said bight thereof is disposed outside of said two corresponding end edges of said upper and lower walls.

12. A supporting instrument, comprising:

a foundation body composed of a channel member the open side of which opens in a substantially horizontal direction, said channel member having upper and lower walls and an upright connecting wall extending between two corresponding side edges of said upper and lower walls, said upper and lower walls having vertically aligned holes therethrough for receiving a fitting therethrough, said upper and lower walls having slots extending from said holes through two corresponding end edges of said channel member, said slots having a width sufficient to permit the fitting to be moved therethrough into said holes, a leaf spring disposed inside of said channel member, said leaf spring having a pair of legs which extend in the same, substantially horizontal direction and external transverse to the end edges of said upper and lower walls, and a bight extending between and connecting the outer ends of said legs, one of said legs bearing on said upright connecting wall and the other of said legs being adapted to bear against the fitting and resiliently press it against the edges of said holes, said upright connecting wall having a main fitting part near one vertical end thereof; and a supporting body which is mounted for pivotal movement with respect to said upright connecting wall near the opposite vertical end of said upright connecting wall, said supporting body extending to said main fitting part and the end of said supporting body close to said main fitting part being elastically deformable and being provided with a subordinate fitting part which is detachably engageable with said main fitting part.

13. A supporting instrument as claimed in claim 12 in which said slots extend substantially parallel with said connecting wall, said legs both extend between said upright connecting wall and said holes, said legs being resiliently biased away from each other so that the fitting is resiliently urged away from said upright connecting wall.

14. A supporting instrument as claimed in claim 13 in which said leaf spring is substantially U-shaped and said bight thereof is disposed outside of said two corresponding end edges of said upper and lower walls.

15. A supporting instrument as claimed in claim 12 in which said slots extend substantially parallel with said connecting wall, one of said legs extends along said upright connecting wall and the other of said legs extends toward portions of the edges of said holes that are remote from said upright connecting wall so that said other leg is adapted to bear against the portion of said fitting that is remote from said upright connecting wall, said legs being resiliently biased toward each other so that the fitting is resiliently urged toward said upright connecting wall.

16. A supporting instrument as claimed in claim 15 in which said leaf spring is substantially V-shaped and said bight thereof is disposed outside of said two corresponding end edges of said upper and lower walls.

* * * * *